United States Patent
Hayes

(10) Patent No.: US 8,511,176 B2
(45) Date of Patent: Aug. 20, 2013

(54) METHOD AND APPARATUS FOR INTERNALLY DETERMINING A LOAD APPLIED BY A JACK

(75) Inventor: John A. Hayes, Gainesville, FL (US)

(73) Assignee: Loadtest, Inc., Gainesville, FL (US)

( * ) Notice: Subject to any disclaimer, the term of this patent is extended or adjusted under 35 U.S.C. 154(b) by 39 days.

(21) Appl. No.: 13/110,733

(22) Filed: May 18, 2011

(65) Prior Publication Data

US 2011/0283816 A1    Nov. 24, 2011

Related U.S. Application Data

(60) Provisional application No. 61/345,782, filed on May 18, 2010.

(51) Int. Cl.
*G01L 1/00* (2006.01)
*G01N 3/00* (2006.01)
*E02D 5/22* (2006.01)

(52) U.S. Cl.
USPC ............... 73/786; 73/768; 73/803; 405/233

(58) Field of Classification Search
USPC ............. 73/768, 786, 803; 405/233, 235
See application file for complete search history.

(56) References Cited

U.S. PATENT DOCUMENTS

| | | | |
|---|---|---|---|
| 2,477,854 A | 8/1949 | Baker | |
| 2,674,876 A | 4/1954 | Caudill | |
| 2,685,794 A | 8/1954 | Hall | |
| 3,355,938 A * | 12/1967 | Neely et al. | 73/862.543 |
| 3,961,524 A * | 6/1976 | de la Cruz | 73/783 |
| 4,103,540 A * | 8/1978 | McLaughlin | 73/831 |
| 4,198,857 A | 4/1980 | Preux | |
| 4,614,110 A | 9/1986 | Osterberg | |
| 5,282,701 A | 2/1994 | An | |
| 5,576,494 A | 11/1996 | Osterberg | |
| 5,608,169 A * | 3/1997 | Fujioka et al. | 73/803 |
| 6,311,567 B1 | 11/2001 | England | |
| 6,647,801 B1 | 11/2003 | Deuar | |
| 7,353,714 B2 * | 4/2008 | England et al. | 73/784 |

* cited by examiner

*Primary Examiner* — Lisa Caputo
*Assistant Examiner* — Punam Roy
(74) *Attorney, Agent, or Firm* — Saliwanchik, Lloyd & Eisenschenk

(57) ABSTRACT

An embodiment of the subject invention is directed to a jack incorporating one or more strain gauges. The one or more strain gauges can be positioned on, within, or integral to the jack. When a load or force is applied by the jack, one or more materials within the jack are deformed or displaced as a result of the applied load. The one or more strain gauges are used to measure the deformation or displacement and thus measure the strain. The measured strain can be used to determine the magnitude of the load applied by the jack. In an embodiment, a plurality of strain gauges are used and the resulting strain measurements can be combined to determine the applied load.

40 Claims, 3 Drawing Sheets

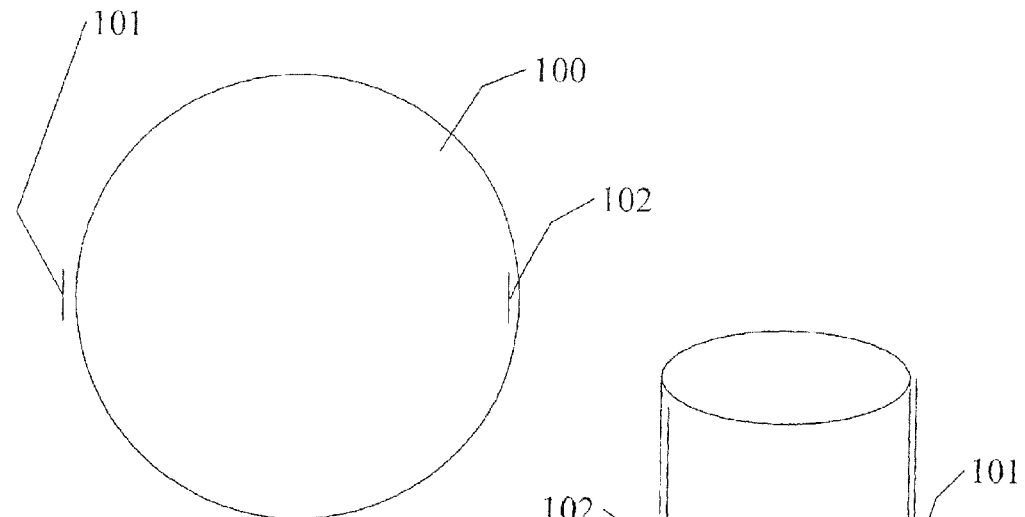
FIG. 3A
FIG. 3B
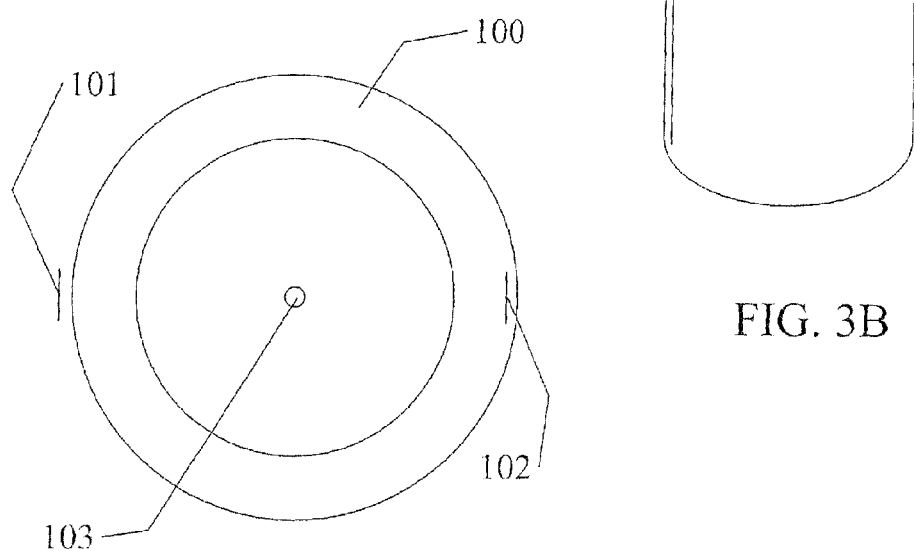
FIG. 3C

METHOD AND APPARATUS FOR INTERNALLY DETERMINING A LOAD APPLIED BY A JACK

CROSS-REFERENCE TO RELATED APPLICATION

The present application claims the benefit of U.S. Provisional Patent Application Ser. No. 61/345,782, filed May 18, 2010, which is hereby incorporated by reference herein in its entirety, including any figures, tables, or drawings

BACKGROUND OF INVENTION

Jacks are used to apply loads or forces in various applications. Typically, a jack is used to apply a push (compressive) or pull (tensile) force to an object. In a particular application, jacks can be used to test the load-bearing capacity and/or stability of piles or other structures. Such structures can be manufactured in various configurations and from various materials. Engineering piles, for example, can be made from wood, concrete, steel, or other building materials known in the art. Such structures can be used for various purposes. Engineering piles, for example, are often driven into the ground, or created by pouring concrete in a formation formed in the ground, to form a foundation for buildings, bridges, or other structures. The jacks can be located under, on top of, or within, the pile and apply a load upward on the pile and/or downward on to the ground beneath the pile, a section of the pile below the jack, or the top of the pile. Regardless of the application, it is often useful to know with some degree of accuracy the load or force applied by a jack.

When a hydraulic jack is used, it is known to measure the pressure of hydraulic fluid in the hydraulic jack and to use such measure of the pressure of the hydraulic fluid and the surface area of the jack effectively normal to the direction of the force in contact with the hydraulic fluid to calculate the load applied by the hydraulic jack. The load is typically the pressure of the hydraulic fluid times the surface area effectively normal to the direction of force being applied by the hydraulic fluid. As an example, for a jack having a cross-sectional area, A, in contact with the hydraulic fluid perpendicular with the direction of the force to be applied by the jack, the force can be calculated as $F=P \cdot A$, where P is the pressure of the hydraulic fluid. However, this method of measuring force can be temperature sensitive because the volume and pressure of the hydraulic fluid will often vary with temperature. Further, this method of measuring force does not account for certain sources of friction, such as friction between the piston and the jack cylinder. Thus, the true load applied by the hydraulic jack can easily differ significantly from the load calculated from the measured pressure of the hydraulic fluid.

BRIEF SUMMARY

Embodiments of the subject invention relate to systems, methods, and apparatus for measuring a load applied by a jack and/or internally determining a load applied by the jack. Embodiments of the subject invention also relate to systems, methods, and apparatus for using a jack to test the load-bearing capacity and/or stability of piles or other structures. In a specific embodiment, a jack can be located on top of, within, or underneath, a pile and apply a load down onto, upward and downward on respective sections, or upward to the bottom of the pile, respectively. Specific embodiments relate to incorporating one or more strain gauges with an Osterberg cell such that the one or more strain gauges are attached to, and/or embedded in, and/or positioned proximate to, a piston of the Osterberg cell. The teachings of U.S. Pat. Nos. 4,614,110 and 5,576,494 are incorporated herein for the teaching of an Osterberg cell in which one or more strain gauges can be incorporated into the cell. FIG. 2 shows an embodiment of an Osterberg cell incorporating one or more strain gauges.

An embodiment of the subject invention is directed to a jack incorporating one or more strain gauges. The one or more strain gauges can be positioned on, within, or integral to the jack, such as on, within, or integral to the piston of the jack. When a load or force is applied by the jack, one or more materials within the jack are deformed or displaced as a result of the applied load. The one or more strain gauges are used to measure the deformation or displacement and thus measure the strain. The measured strain can be used to determine the magnitude of the load applied by the jack. In a specific embodiment, the load applied by the jack can be calculated using the following relationship:

$$\text{Load} = \epsilon AE/L$$

where $\epsilon$ is the strain, A is the area in contact with the hydraulic fluid perpendicular with the direction of the force to be applied by the jack, E is the elastic modulus, and L is the length of material over which the strain is measured. In an embodiment, a plurality of strain gauges are used and the resulting strain measurements can be combined to determine the applied load.

Another embodiment of the subject invention is directed to a method of measuring a load applied by a jack and/or measuring the load bearing capacity of a pile. In an embodiment, one or more strain gauges are positioned on, within, or integral with one or more materials of the jack. When a load or force is applied by the jack, the one or more materials within the jack are deformed or displaced as a result of the applied load. The one or more strain gauges are used to measure the deformation or displacement and thus measure the strain on the one or more materials. The measured strain is then used to determine the magnitude of the load applied by the jack.

Yet another embodiment of the subject invention is directed to a method of measuring a load applied to a pile and/or the load bearing capacity of a pile. In an embodiment, a jack incorporating one or more strain gauges can be positioned proximate to or within a pile to be tested. In an embodiment, the jack can be positioned under, on top of, or within the pile to be tested. A load or force is applied to the pile, a section of the pile, and/or the ground or other material surrounding the pile. In an embodiment, the load or force is applied upward and/or downward on the pile, the ground or other material beneath the pile, a section of the pile below the jack, and/or a section of the pile above the jack. In an embodiment, the load or force is applied to an interior surface of the pile. When the load or force is applied, one or more signals are received corresponding to the one or more strain gauges incorporated in the jack. In an embodiment, the one or more signals are used to measure a strain on the jack. In an embodiment, the one or more strain gauges are positioned on, within, or integral with one or more materials of the jack, and the one or more strain gauges are used to measure the deformation or displacement of the one or more materials. The measured deformations and displacements are then used to measure a strain on the jack. The measured stain on the jack is then used to determine the magnitude of the applied load or force. One or more suitably programmed computers can be used to monitor the applied load or force; receive and/or process the one or more signals; measure, calculate, and/or otherwise determine the deformation or displacement of the one or more materials, the strain on the jack, and/or another result of the testing; and/or determine when testing is complete.

BRIEF DESCRIPTION OF DRAWINGS

FIGS. 3A-3C show various locations for positioning strain gauges in accordance with embodiments of the subject invention.

DETAILED DISCLOSURE

Figure 1A:
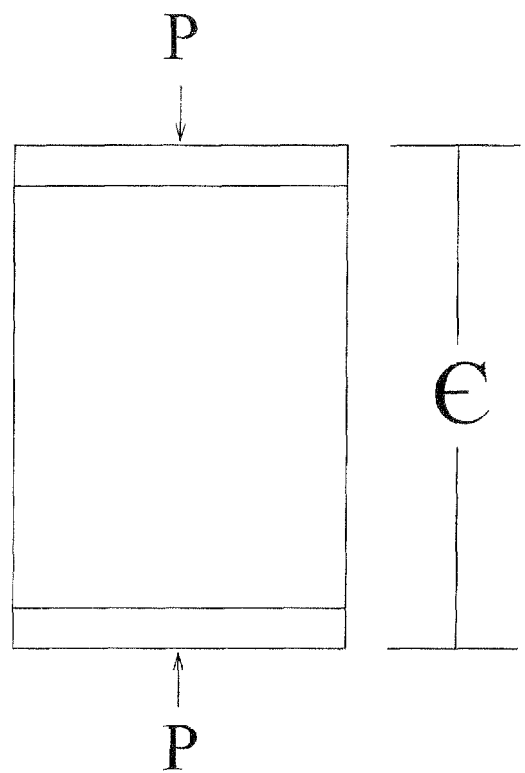
FIG. 1A shows the application of a force or pressure (P) applied to a jack.

Embodiments of the subject invention relate to systems, methods, and apparatus for measuring a load applied by a jack. Embodiments of the subject invention also relate to systems, methods, and apparatus for using a jack to test the load-bearing capacity and/or stability of piles or other structures. In a specific embodiment, a jack can be located on top of, within, or underneath, a pile and apply a load down onto, upward and downward to respective sections, or upward to the bottom of the pile, respectively.

When a load is applied by a jack, one or more materials of the jack can be deformed or displaced as a result of the applied load. In an embodiment of the subject invention, at least one strain gauge is incorporated in a jack to measure deformation or displacement of the one or more materials of the jack. In an embodiment, the at least one strain gauge is positioned on, within, or integral with the one or more materials of the jack, such as on, within, or integral with the piston of the jack.

In an embodiment, a strain gauge includes a semiconductor material that is positioned on, within, or integral with at least one of the one or more materials of the jack. When the material of the jack is deformed or displaced, the shape of the semiconductor material changes thus varying the resistance of the semiconductor material. The resistance of the semiconductor material can then be measured, by use of a Wheatstone bridge for example, to determine the degree of deformation or displacement of the jack material. Various other strain gauges or sensors can be used to measure such deformation or displacement. In a specific embodiment, a vibratory wire strain gauge is utilized.

In an embodiment, one or more such strain gauges or other sensors can be positioned on, within, or integral with one or more materials of a jack, such as a piston of a jack. In an embodiment, the sensors are positioned at locations that experience stress due to a load during jacking. For example, a strain gauge can be applied to one or more load-bearing surfaces of the jack such as a surface configured to contact an object to which the load is to be applied, a reaction member, restraining member, and/or other surface. In an embodiment, a strain gauge is positioned on, within, or integral with an external surface of the jack. In an embodiment, a strain gauge is positioned on, within, or integral with an internal surface of the jack. In an embodiment, the jack includes a cylinder and a strain gauge or other sensor is positioned on, within, or integral with the cylinder. In an embodiment, the sensor is positioned on, within, or integral with an internal surface of the cylinder. In an embodiment, the sensor is positioned on, within, or integral with an external surface of the cylinder. In an embodiment, the sensor is positioned on, within, or integral with the top surface of the cylinder. In an embodiment, the jack includes a piston and a strain gauge or other sensor is positioned on, within, or integral with the piston. In an embodiment, the sensor is positioned on, within, or integral with an external surface of the piston. In an embodiment, the sensor is positioned on, within, or integral with an internal surface of the piston.

Figure 2:
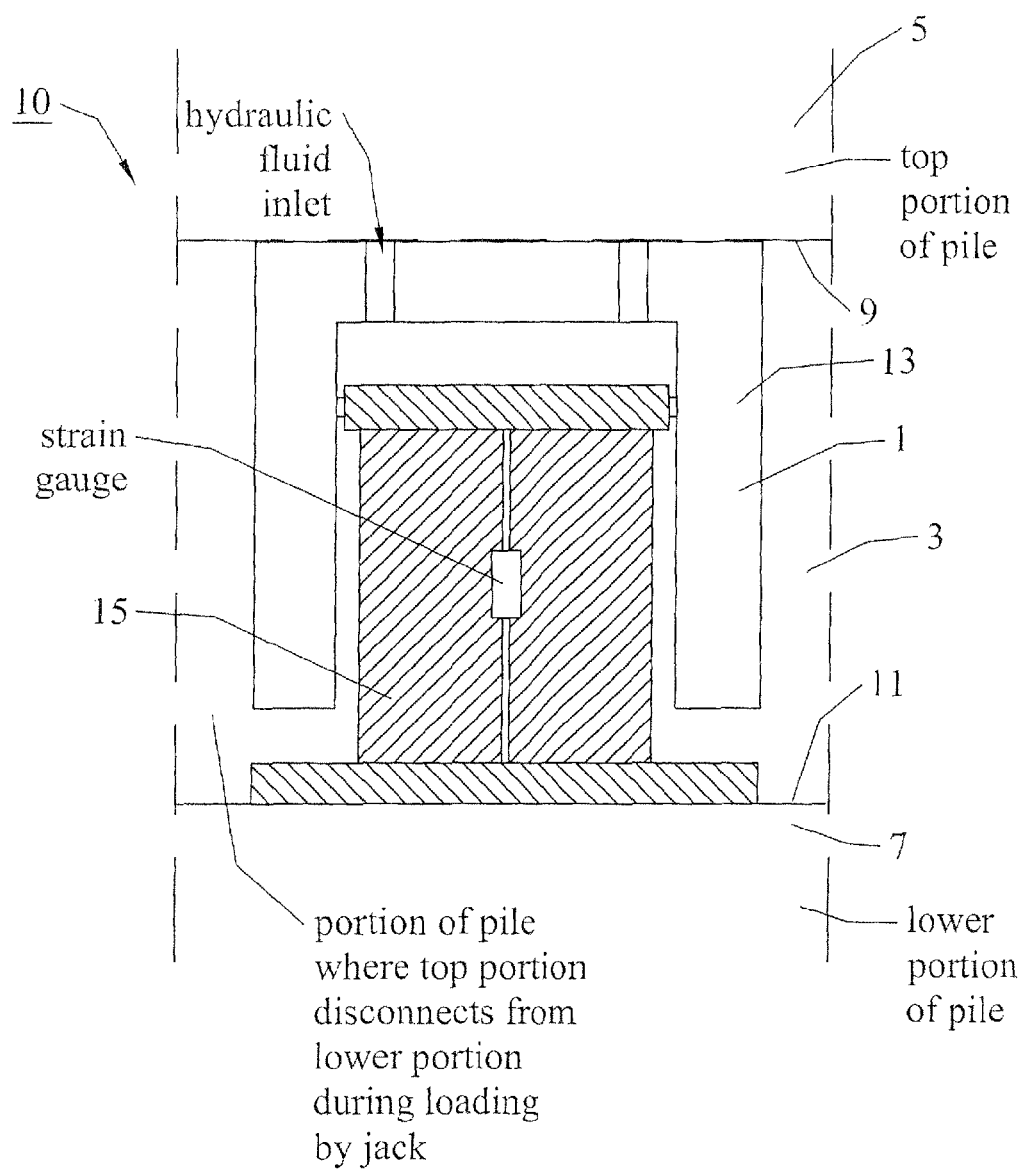
FIG. 2 shows a cylinder and piston of a jack, where a strain gauge is embedded in the piston in accordance with an embodiment of the subject invention.

FIG. 2 shows a cylinder and piston of a jack, where the piston fits within the cylinder and a strain gauge is embedded in the piston in accordance with an embodiment of the subject invention. In an embodiment, a strain gauge or other sensor is positioned on, within, or integral with another material of the jack. In an embodiment, a strain gauge or other sensor is positioned across more than one material of the jack such that the strain gauge can measure displacement of the materials in relation to one another. In an embodiment, such sensors can be configured and/or oriented to best measure displacement and/or deformation likely to be caused by operation of the jack. For example, where strain is measured by the deformation of a semiconductor material, the semiconductor material can be configured and/or oriented such that a small displacement and/or deformation in the likely direction causes a measurable change in the resistance of the semiconductor. Referring to FIG. 2, preferably, the strain gauge is positioned below the location of the application of friction forces, or other forces, to the piston from the top and positioned above the forces applied to the piston from the bottom.

Referring to FIGS. 3A-3C, the location of one or more strain gauges with respect to the piston, in accordance with specific embodiments, are shown. FIG. 3A shows a top view of a piston 100 with a strain gauge 101 attached to the surface of the piston and another strain gauge 102 embedded in the piston. FIG. 3B shows a perspective view of the piston of FIG. 3A with the same strain gauges 101 and 102. FIG. 3C shows a top view of a hollow piston 100, having an annular cross section, having strain gauge 101 attached to the surface of the piston, strain gauge 102 embedded in the piston, and strain gauge 103 positioned proximate to the piston, where strain gauge 103 is attached to a top plate and a bottom plate (FIG. 2 shows a piston having a top plate and a bottom plate, which can have a strain gauge inside the piston and attached to the top plate and the bottom plate). In a specific embodiment, at least 3, and preferably 4, strain gauge are positioned around the piston such that any eccentricity and/or bending of the piston during loading can be accounted for. In a further specific embodiment, a hollow piston can have a plurality of strain gauges located on the inside surfaces of the walls of the piston. Preferably there are at least three, and more preferably at least four strain gauges, positioned symmetrically around the circumference of the interior wall of the hollow piston. In a further preferred embodiment, a strain gauge can be connected to a top plate and to a bottom plate of a hollow piston such that the strain gauge can measure the deflection of the top plate of the piston where pressure is applied to the fluid in the jack, so as to provide information regarding the load applied to the top plate of the piston. In a more preferred embodiment, the strain gauge extending from the top plate to the bottom plate is used in conjunction with a plurality of strain gauges on the interior surface of the walls of the piston. The use of one or more strain gauge attached to, embedded in, and/or positioned proximate to the piston turns the piston into a strain meter allowing a determination to be made of the load applied by the jack that incorporates the piston.

In an embodiment, one or more such strain gauges or other sensors are embedded within one or more materials of a jack. In an embodiment, one or more such sensors are embedded within one or more materials of a jack during the jack's manufacture. For example, a metal alloy piston can be cast around a strain gauge or other sensor. In an embodiment, the strain gauge includes an insulating material that protects the strain gauge during casting. In a specific embodiment, the piston is made of steel.

In an embodiment, one or more such strain gauges or other sensors are positioned on one or more surfaces of one or more materials of a jack. Various methods can be used to position such a sensor on a surface. In an embodiment, a sensor is attached to a surface via at least one fastener. In an embodiment, a portion of the sensor is attached to a first surface, and another portion of the sensor is attached to a second surface. In an embodiment, the sensor is configured to measure displacement of the first surface relative to the second surface (or vice versa). Various fasteners can be used with the subject invention. In an embodiment, a mechanical fastener is used such as a nail, pin, bolt, screw, bracket, or other structure. In an embodiment, an adhesive fastener is used such as an epoxy, glue, or other adhesive. In an embodiment, the fastener also serves to insulate the sensor from electrical and/or temperature variations from the surface.

In specific embodiments, a vibratory wire strain gauge can be used. As an example, a vibratory wire strain gauge can be incorporated in the piston of FIG. 2 and have a cross-sectional shape shown in FIG. 3C where the strain gauge is shown as 103. In further embodiments, a wheatstone bridge type strain gauge can be used.

In an embodiment, commands can be sent to the jack to control its operation. For example, commands can be sent to actuate the jack, decrease the force applied by the jack, increase the force applied by the jack, or otherwise control the operation of the jack. In an embodiment, the jack includes an onboard processor. In an embodiment, the onboard processor allows the jack to receive and execute more complex commands. In an embodiment, such an onboard processor can perform some or all of the measurements, calculations, determinations, and/or other processing described herein. For example, the jack with such an onboard processor can function to maintain the application of a particular load. In an embodiment, simple or complex commands are communicated to the jack. In an embodiment, such commands are communicated from one or more suitably programmed computers. In an embodiment, one or more suitably programmed computers incorporate a load monitoring system configured to perform some or all of the measurements, calculations, determinations, and/or other processing described herein and otherwise control the operation of the jack. As described below, the functions of such a load monitoring system can be distributed across a network. In an embodiment, an onboard processor incorporates at least part of the load monitoring system. In another embodiment, all such processing is performed remotely and simple commands are communicated to the jack.

In an embodiment, signals, measurements, or other data can be received from the jack, strain gauges, or other sensors. For example, measurements from at least one strain gauge can be received. In an embodiment, as described above, the jack includes an onboard processor. In an embodiment, the onboard processor allows the jack to process and transmit more complex data. In an embodiment, simple or complex commands are communicated from the jack. In an embodiment, such commands are communicated to one or more suitably programmed computers and/or a load monitoring system that can perform some or all of the measurements, calculations, determinations, and/or other processing described herein. As described below, commands and data can be communicated to and from the jack using any number of wired or wireless communications technologies.

In an embodiment, one or more deformation, displacement, and/or strain measurements taken when a jack is under load are used to determine a load applied by a jack. In an embodiment, an established relationship between such measurements and pressure, load, stress or other properties is used to determine the applied load. In an embodiment, the relationship can be expressed by a function or curve. In an embodiment, the relationship is known in the art. In an embodiment, the relationship is deduced from known or measured properties of the jack. In an embodiment, the relationship is induced from empirical observation of the jack. In an embodiment, the relationship comprises a relationship between such measurements and a load applied to the jack. In an embodiment, the relationship includes a relationship between a load applied to one or more particular materials and deformation of the one or more particular materials. In an embodiment, the relationship includes a relationship between a load applied to one or more particular materials and displacement of the one or more particular materials. In an embodiment, the displacement measures the displacement of a first material of the one or more particular materials relative to the position of at least one second material of the one or more particular materials. In another embodiment, the displacement measures the displacement of one of the one or more particular materials relative to at least one other position, such as the position of a point on the jack, a pile or other structure being tested, another pile or other structure, a man-made of geographic landmark, a satellite, and/or another fixed or moving point. In an embodiment, the deformation or displacement is used to measure a strain on the one or more particular materials, and the relationship involves at least one relationship between a load applied to the one or more particular materials and a strain on the one or more particular materials. In an embodiment, a relationship is specific to the content, shape, or other configuration of the particular material deformed, displaced, or strained. In another embodiment, a general relationship for materials of a certain class (e.g., ductile materials, brittle materials) can be used. In an embodiment, the jack is calibrated with one or more strain gauges in order to observe a relationship. In a particular embodiment, known loads are applied to the jack (e.g., weights) and the resulting deformation, displacement, and/or strain measurements are observed. In another embodiment, a hydraulic jack is calibrated based on the pressure of hydraulic fluid supplied to the jack and the surface area of the jack effectively normal to the direction of the force in contact with the hydraulic fluid. In a particular embodiment, such observations are made under controlled conditions (e.g., constant temperature and pressure, reduced friction) in order to remove as much noise as possible.

FIG. 1A shows a load, such as pressure (P), being applied to both ends of a jack and identifies where strain is measured.

Figure 1B:
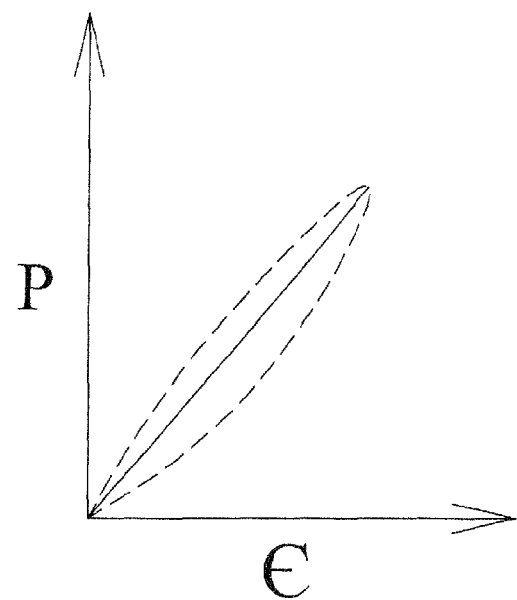
FIG. 1B shows a pressure (P) vs. strain ($\epsilon$) curve for the jack that can be used to calculate a load applied by the jack based on one or more strains measured within the jack by one or more strain gauges in accordance with an embodiment of the subject invention.

FIG. 1B shows a pressure (P) vs. strain ($\epsilon$) curve for the jack that can be used to calculate a load applied by the jack based on one or more strains measured within the jack by one or more strain gauges in accordance with an embodiment of the subject invention. FIG. 1B shows that the relationship between the pressure applied and the strain may not always fit a perfectly linear model. A similar curve can be produced for load vs. strain, where the load applied by the jack is equal to the pressure of the pressurized fluid in the jack times the cross-sectional area of the piston, minus any frictional forces between the cylinder of the jack and the piston of the jack. The load applied by the jack can be measured externally by, for example, using known weight or other known methods for measuring load. In certain embodiments, the force versus strain relationship may have hysteresis, such that as the force is increased from zero the measured strain lags behind the strain predicted by the linear model, and when the non-zero force is lowered the strain falls less than the amount predicted by the linear model. In a specific embodiment, once the relationship of force versus strain is measured, which can be the result of averaging many repeated movements, the measured relationship can be used to calculate the force, or load, for a given measured strain.

In a specific embodiment, the calculated load applied by the jack can be dependent on the derivative of the load an/or the sign of the derivative of the load. For example, if the load is increasing the calculated load can be a first value for a given measured strain and if the load is decreasing the calculated load can be a second value for the same measured strain. Further, each jack can be individually characterized by measuring a force-strain curve or a model of jack can be characterized by measuring one or more force-strain curves for a corresponding one or more jacks of a certain model. The one or more force-strain curves can then be used to create a model force-strain curve for the model jack. Converting from pressure, P, to force, F, can be accomplished by the relationship $F=P \cdot A$, where A is area that the pressure from the pressurized fluid is applied to the jack as discussed above. In a specific embodiment, the load versus strain relationship is assumed to be linear. Preferably, each jack, or cell, is calibrated prior to use to determine the load versus strain relationship. In a specific embodiment, the jack can be loaded and the load measured or determined by external means and the strain measured, in order to arrive at the load-strain relationship.

In a specific embodiment, a piston that is to be used in a jack can be used to create a pressure-strain curve and/or a force-strain curve such that a pressure is applied to the piston and the strain measured and the load applied by the jack is measured, and then the pressure-strain and/or the load-strain curve can be used to use a measured strain from the jack in use to calculate a corresponding pressure applied to the piston and/or a force applied by the jack. In another embodiment, a jack, including the cylinder and piston, can be used to create a pressure-strain curve or a load-strain curve, such that a pressure is applied to the top of the cylinder and a load is applied to the bottom of the piston and the strain is measured. The curve can then be used to use a measured strain during use of the jack to calculate a corresponding pressure or load. Further, the pressure measured during use of the jack can be used to estimate the load applied by the jack, and the strain-load relationship can be used to use a measured strain to calculate the load, and the estimate of the load from the pressure can be used to check the calculated load from the strain, or vice-versa. This embodiment of using pressure to estimate the load may not be as accurate as the frictional forces between the cylinder and jack existing during the creation of the pressure-strain curve may not be the same as the frictional forces during use of the jack.

In an embodiment, a plurality of deformation, displacement, and/or strain measurements are used to determine a load applied by a jack. In an embodiment, the measurements come from the same sensor at different points in time. In an embodiment, the measurements come from sensors positioned at different locations within the jack. In an embodiment, the measurements come from sensors positioned on or in different surfaces within the jack. In an embodiment, the measurements or other data can be communicated to one or more suitably programmed computers configured to perform some or all of the measurements, calculations, determinations, and/or other processing described herein. In an embodiment, the measurements or other data are communicated to an onboard processor. In an embodiment, the measurements or other data are communicated to a load monitoring system. In an embodiment, the measurements are combined before the established relationship is applied to determine the load. In an embodiment, the measurements are averaged. In an embodiment, a weighted average is used. For example, in an embodiment, a weight for a strain measurement is assigned based on the known or observed properties of the strained surface.

In a further embodiment, the magnitude of the applied load is confirmed by other measurements. For example, where a hydraulic jack is used, the applied load can be confirmed by measuring the pressure of the hydraulic fluid used and the surface area of the jack effectively normal to the direction of the force in contact with the hydraulic fluid, and multiplying the pressure by the surface area as described above. In this case, friction between the cylinder and the piston will decrease the load for the same pressure.

In an embodiment of the subject invention, one or more jacks are used to test the suitability of a building material for a particular purpose. In an embodiment, the one or more jacks are used to apply compressive or tensile forces to the building material. Materials can be tested to ensure the materials are suitable in various ways for the particular purpose. For example, the structural integrity of an aircraft wing can be tested. In another embodiment, the stability and/or load-bearing capacity of a pile or other structure can be tested. In a particular embodiment, the stability of a sunken engineering pile can be tested. In an embodiment, the one or more jacks are positioned on and apply forces to the exterior of the tested material. For example, a compressive force can be applied to the top, bottom, and/or side of a sunken engineering pile.

In an embodiment, at least one of the one or more jacks is positioned inside the test material. For example, a jack can be cast inside a concrete pile. When the at least one jack is operated forces are applied to one or more interior surfaces of the test material. In a particular embodiment, the test material is a pile and the forces are applied to one or more sections of the pile. In an embodiment, wireless or wired communication is possible with an embedded jack such that the jack can be actuated and/or sensor information can be retrieved from the embedded jack. Various communication methods known in the art can be used to pass such commands or information. In an embodiment, the jack is actuated via signals communicated to the jack. In an embodiment, measurements or other information are communicated from strain gauges or other sensors in the jack via signals. In an embodiment, the jack contains an onboard processor whereby load determinations, measurements, and/or calculations are made and intermediate or final load values are received from the jack via such signals. In an embodiment, commands can be communicated from one or more suitably programmed computers to control the operation of the jack. In an embodiment, the commands are communicated from an onboard processor. In an embodiment, the commands are communicated from a load monitoring system. In an embodiment, one or more suitably programmed computers and/or a load monitoring system can receive data from or send commands to a plurality of jacks.

FIG. 2 shows a jack 1 embedded inside an engineering pile 10 (dotted lines) in accordance with an embodiment of the subject invention. In the embodiment shown, the jack 1 is positioned within a middle portion 3 of the engineering pile between a top portion 5 of the pile and a lower portion 7 of the pile 10. In an embodiment, the jack 1 applies a load, L, to a lower surface 9 of the top portion 5 of the pile 10, the top surface 11 of the lower portion of the pile, or both. In the embodiment shown in FIG. 2, the load, L, is applied upward to the top portion of the pile and the load, L, is applied downward to the lower portion of the pile. Application of the load, L, to the top portion can be a combination of forces applied by the top surface of the jack cylinder 13 to the bottom surface 9 of the top portion of the pile and forces applied to the middle portion 3 of the pile by the sides of the jack cylinder 13, wherein the middle portion 3 then applies a force to the bottom surface 9 of the top portion 5. In an embodiment, the jack applies a load to another interior surface of the pile. This can be accomplished by locating the jack in a different position and/or interconnecting the jack to other portions of the pile via, for example, rods or other apparatus for transferring force. In an embodiment, a compressive force is applied. In an embodiment, a tensile force is applied.

In an embodiment, the top and lower portions of the pile disconnect during testing of the pile when the jack is loaded. Referring to FIG. 2, the top portion 5 and lower portion 7 can separate when the jack is loaded by the pile breaking apart at the intersection of the middle portion 3 and the lower portion 7, such that the cylinder 13 of the jack moves up with the middle portion and the cylinder 13 and middle portion push up the top portion 5.

In an embodiment, when hydraulic fluid is supplied to the jack through the hydraulic fluid inlets and exerts pressure (P) within the cylinder, including onto the jack's piston. The applied load, L, which is applied to the top of the bottom portion of the pile and applied to the bottom of the top portion of the pile, can be measured via one or more strain gauges within the piston and/or within the top of the cylinder. In an embodiment, the subject invention can provide real time measurements of the strains from strain gauge positioned on, within, or embedded in the piston during load testing of a pile that can be used to calculate the load and, if desired, confirm this calculated load by measuring the pressure of the hydraulic fluid and the surface area of the jack effectively normal to the direction of the force in contact with the hydraulic fluid, and multiplying the pressure by the surface area as described above. When calculating the load, L, applied by the jack to the pile by measuring the pressure of the hydraulic fluid and multiplying this pressure by the surface area of the jack effectively normal to the direction of the force in contact with the hydraulic fluid, e.g., the surface area of the top of the piston and the surface area of the top of the cylinder in contact with the hydraulic fluid, it is important to remember that any friction between the cylinder and the piston of the jack will reduce the amount of load, L, applied to the pile, such that $L = P_{HF} \times A - f$, where L is the load applied to the pile, $P_{HF}$ is the pressure of the hydraulic fluid, A is the surface area of the jack effectively normal to the direction of the force in contact with the hydraulic fluid, and f is the frictional force between the piston and the cylinder of the jack. In this way, the load determined by the strain gauges, positioned in the piston and/or top of cylinder, can be more accurate than the load determined by measuring the pressure of the hydraulic fluid and multiplying by the area of the piston.

In an embodiment, a load monitoring system is provided including one or more program modules for controlling the operation of the system, memory, one or more processors, one or more input interfaces and devices, one or more output interfaces and devices, and/or one or more application programs interfaces. In an embodiment, a testing system is provided including at least one jack with at least one strain gauge, material to be tested, one or more reaction or restraining members, and/or one or more suitably programmed computers. In an embodiment, one or more of the at least one jack is positioned inside the material to be tested. In an embodiment, one or more of the at least one jack includes at least one strain gauge positioned therein. In an embodiment, the testing system comprises a load monitoring system. U.S. Pat. No. 6,311,567 to England describes a testing system. This document is incorporated by reference herein (to the extent it is not inconsistent with the explicit teachings of this specification) to further describe possible elements and configurations of such a load testing system.

Aspects of the invention may be described in the general context of computer-executable instructions, such as program modules, being executed by a computer. Generally, program modules include routines, programs, objects, components, data structures, etc., that perform particular tasks or implement particular abstract data types. Such program modules can be implemented with hardware components, software components, or a combination thereof. Moreover, those skilled in the art will appreciate that the invention can be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention can be practiced without these specific details. Computer systems, servers, work stations, and other machines can be connected to one another across a communication medium including, for example, a network or networks.

As one skilled in the art will appreciate, embodiments of the present invention can be embodied as, among other things: a method, system, or computer-program product. Accordingly, the embodiments can take the form of a hardware embodiment, a software embodiment, or an embodiment combining software and hardware. In an embodiment, the present invention takes the form of a computer-program product that includes computer-useable instructions embodied on one or more computer-readable media. Methods, data structures, interfaces, and other aspects of the invention described above can be embodied in such a computer-program product.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. In an embodiment, non-transitory media are used.

The invention can be practiced in distributed-computing environments where tasks are performed by remote-processing devices that are linked through a communications network or other communication medium. In a distributed-computing environment, program modules can be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention can be practiced in a network environment such as a communications network. Such networks are widely used to connect various types of network elements, such as routers, servers, gateways, and so forth. Further, the invention can be practiced in a multi-network environment having various, connected public and/or private networks.

Communication between network elements can be wireless or wireline (wired). As will be appreciated by those skilled in the art, communication networks can take several different forms and can use several different communication protocols.

Embodiments of the subject invention can be embodied in a processing system. Components of the processing system can be housed on a single computer or distributed across a network as is known in the art. In an embodiment, components of the processing system are distributed on computer-readable media. In an embodiment, a user can access the processing system via a client device. In an embodiment, some of the functions or the processing system can be stored and/or executed on such a device. Such devices can take any of a variety of forms. By way of example, a client device may be a desktop or laptop computer, a personal digital assistant (PDA), an MP3 player, a communication device such as a telephone, pager, email reader, or text messaging device, or any combination of these or other devices. In an embodiment, a client device can connect to the processing system via a network. As discussed above, the client device may communicate with the network using various access technologies, both wireless and wireline. Moreover, the client device may include one or more input and output interfaces that support user access to the processing system. Such user interfaces can further include various input and output devices which facilitate entry of information by the user or presentation of information to the user. Such input and output devices can include, but are not limited to, a mouse, touch-pad, touch-screen, or other pointing device, a keyboard, a camera, a monitor, a microphone, a speaker, a printer, a scanner, among other such devices. As further discussed above, the client devices can support various styles and types of client applications.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A method of determining a load applied by a jack, comprising:
   providing a jack having at least one strain gauge positioned such that a corresponding at least one strain experienced by the jack is related to a load applied by the jack in accordance with a load-strain relationship;
   applying a load with the jack;
   measuring the corresponding at least one strain from the at least one strain gauge; and
   determining the load applied by the jack based on the load-strain relationship,
   wherein the jack comprises a piston, a cylinder for receiving the piston, and a fluid positioned between a top surface of the piston and a bottom surface of a top of the cylinder, wherein pressurizing the fluid creates a first force on the piston and a second force on the cylinder tending to separate the piston and the cylinder,
   wherein the at least one strain gauge is incorporated with the piston of the jack, wherein the at least one strain is at least one strain experienced by the piston.

2. The method according to claim 1, wherein one or more of the at least one strain gauge is attached to the piston.

3. The method according to claim 2, wherein the one or more of the at least one strain gauge is attached to a surface of the piston.

4. The method according to claim 1, wherein one or more of the at least one strain gauge is embedded in the piston.

5. The method according to claim 1, wherein one or more of the at least one strain gauge is positioned proximate the piston.

6. The method according to claim 5, wherein the piston comprises a hollow body, a top plate, and a bottom plate, wherein one of the at least one strain gauge is attached to the top plate and attached to the bottom plate of the piston.

7. The method according to claim 1, further comprising:
   determining the load-strain relationship by applying one or more loads with the jack and measuring the corresponding one or more strains from the at least one strain gauge to determine the load-strain relationship.

8. The method according to claim 7, wherein determining the load-strain relationship comprises producing a load-strain curve from the one or more applied loads and the corresponding one or more strains, wherein the load-strain curve represents the load-strain relationship.

9. A method of determining a load applied by a jack to a pile, comprising:
   positioning a jack with respect to a pile such that the jack can apply a load to the pile;
   measuring at least one strain on the jack from at least one strain gauge incorporated with the jack;
   determining the load applied by the jack to the pile based on a load-strain relationship,
   wherein the jack comprises a piston, a cylinder for receiving the piston, and a fluid positioned between a top surface of the piston and a bottom surface of a top of the cylinder, wherein pressurizing the fluid creates a first force on the piston and a second force on the cylinder tending to separate the piston and the cylinder,
   wherein the at least one strain gauge is incorporated with the piston of the jack, wherein the at least one strain is at least one strain experienced by the piston.

10. The method according to claim 9, wherein one or more of the at least one strain gauge is attached to the piston.

11. The method according to claim 10, wherein the one or more of the at least one strain gauge is attached to a surface of the piston.

12. The method according to claim 9, wherein one or more of the at least one strain gauge is embedded in the piston.

13. The method according to claim 9, wherein one or more of the at least one strain gauge is positioned within the piston.

14. The method according to claim 13, wherein the piston comprises a hollow body, a top plate, and a bottom plate, wherein one or more of the at least one strain gauge is attached to the top plate and attached to the bottom plate of the piston.

15. The method according to claim 9, further comprising:
    determining the load-strain relationship by applying one or more loads with the jack and measuring the corresponding one or more strains from the at least one strain gauge to determine the load-strain relationship.

16. The method according to claim 15, wherein determining the load-strain relationship comprises producing a load-strain curve from the one or more applied loads and the corresponding one or more strains, wherein the load-strain curve represents the load-strain relationship.

17. A method of measuring a load-bearing capacity of a pile, comprising:
    positioning a jack with respect to a pile such that the jack can apply a load to the pile;
    measuring at least one strain on the jack from at least one strain gauge incorporated with the jack;
    determining the load applied by the jack based on a load-strain relationship; and
    determining a load-bearing capacity of the pile using the determined load,
    wherein the jack comprises a piston, a cylinder for receiving the piston, and a fluid positioned between a top surface of the piston and a bottom surface of a top of the cylinder, wherein pressurizing the fluid creates a first force on the piston and a second force on the cylinder tending to separate the piston and the cylinder,
    wherein the at least one strain gauge is incorporated with the piston of the jack, wherein the at least one strain is at least one strain experienced by the piston.

18. The method according to claim 17, wherein one or more of the at least one strain gauge is attached to the piston.

19. The method according to claim 18, wherein the one or more of the at least one strain gauge is attached to a surface of the piston.

20. The method according to claim 17, wherein one or more of the at least one strain gauge is embedded in the piston.

21. The method according to claim 17, wherein one or more of the at least one strain gauge is positioned proximate the piston.

22. The method according to claim 21, wherein the piston comprises a hollow body, a top plate, and a bottom plate, wherein one of the at least one strain gauge is attached to the top plate and attached to the bottom plate of the piston.

23. The method according to claim 17, further comprising:
    determining the load-strain relationship by applying one or more loads with the jack and measuring the corresponding one or more strains from the at least one strain gauge to determine the load-strain relationship.

24. The method according to claim 23, wherein determining the load-strain relationship comprises producing a load-strain curve from the one or more applied loads and the corresponding one or more strains, wherein the load-strain curve represents the load-strain relationship.

25. A system for determining a load applied by a jack, comprising:
    a jack, wherein the jack is configured to apply a load, wherein the jack incorporates at least one strain gauge, wherein the at least one strain gauge is positioned with respect to the jack such that a corresponding at least one strain measured from the at least one strain gauge can be used to determine the load applied by the jack via a strain-load relationship,
    wherein the jack comprises a piston, a cylinder for receiving the piston, and a fluid positioned between a top surface of the piston and a bottom surface of a top of the cylinder, wherein pressurizing the fluid creates a first force on the piston and a second force on the cylinder tending to separate the piston and the cylinder,
    wherein the at least one strain gauge is incorporated with the piston of the jack, wherein the at least one strain is at least one strain experienced by the piston.

26. The system according to claim 25, wherein one or more of the at least one strain gauge is attached to the piston.

27. The system according to claim 26, wherein the one or more of the at least one strain gauge is attached to a surface of the piston.

28. The system according to claim 25, wherein one or more of the at least one strain gauge is embedded in the piston.

29. The system according to claim 25, wherein one or more of the at least one strain gauge is positioned within the piston.

30. The system according to claim 29, wherein the piston comprises a hollow body, a top plate, and a bottom plate, wherein one or more of the at least one strain gauge is attached to the top plate and attached to the bottom plate of the piston.

31. The system according to claim 25, further comprising:
    a means for determining the load-strain relationship by applying one or more loads with the jack and measuring the corresponding one or more strains from the at least one strain gauge to determine the load-strain relationship.

32. The system according to claim 31, wherein determining the load-strain relationship comprises producing a load-strain curve from the one or more applied loads and the corresponding one or more strains, wherein the load-strain curve represents the load-strain relationship.

33. A jack, comprising:
    a piston, wherein the jack is configured to apply a load, wherein the jack incorporates at least one strain gauge, wherein the at least one strain gauge is positioned with respect to the jack such that a corresponding at least one strain measured from the at least one strain gauge can be used to determine the load applied by the jack via a strain-load relationship,
    a cylinder for receiving the piston, and a fluid positioned between a top surface of the piston and a bottom surface of a top of the cylinder, wherein pressurizing the fluid creates a first force on the piston and a second force on the cylinder tending to separate the piston and the cylinder,
    wherein the at least one strain gauge is incorporated with the piston of the jack, wherein the at least one strain is at least one strain experienced by the piston.

34. The jack according to claim 33, wherein one or more of the at least one strain gauge is attached to the piston.

35. The jack according to claim 34, wherein the one or more of the at least one strain gauge is attached to a surface of the piston.

36. The jack according to claim 34, wherein one or more of the at least one strain gauge is embedded in the piston.

37. The jack according to claim 34, wherein one or more of the at least one strain gauge is positioned within the piston.

38. The jack according to claim 37, wherein the piston comprises a hollow body, a top plate, and a bottom plate, wherein one or more of the at least one strain gauge is attached to the top plate and attached to the bottom plate of the piston.

39. The jack according to claim 33, further comprising:
    a means for determining the load-strain relationship by applying one or more loads with the jack and measuring the corresponding one or more strains from the at least one strain gauge to determine the load-strain relationship.

40. The jack according to claim 39, wherein determining the load-strain relationship comprises producing a load-strain curve from the one or more applied loads and the corresponding one or more strains, wherein the load-strain curve represents the load-strain relationship.

* * * * *

UNITED STATES PATENT AND TRADEMARK OFFICE
CERTIFICATE OF CORRECTION

| | | |
|---|---|---|
| PATENT NO. | : 8,511,176 B2 | Page 1 of 1 |
| APPLICATION NO. | : 13/110733 | |
| DATED | : August 20, 2013 | |
| INVENTOR(S) | : John A. Hayes | |

It is certified that error appears in the above-identified patent and that said Letters Patent is hereby corrected as shown below:

In the Specification

Column 2,
Line 63, "measured stain on" should read --measured strain on--.

Column 6,
Line 33, "of geographic" should read --or geographic--.

Column 7,
Line 15, "an/or" should read --and/or--.

Signed and Sealed this
Twenty-ninth Day of July, 2014

Michelle K. Lee
*Deputy Director of the United States Patent and Trademark Office*